(12) United States Patent
Marathe et al.

(10) Patent No.: US 11,157,511 B2
(45) Date of Patent: Oct. 26, 2021

(54) PHYSICAL REPLICATION OF DATABASE

(71) Applicant: SAP SE, Walldorf (DE)

(72) Inventors: Nandan Marathe, Pune (IN); Anant Agarwal, Cambridge, MA (US); Sagar Ranadive, Pune (IN); Dipesh Pandit, Pune (IN)

(73) Assignee: SAP SE, Walldorf (DE)

( * ) Notice: Subject to any disclaimer, the term of this patent is extended or adjusted under 35 U.S.C. 154(b) by 209 days.

(21) Appl. No.: 15/654,028

(22) Filed: Jul. 19, 2017

(65) Prior Publication Data
US 2019/0026352 A1 Jan. 24, 2019

(51) Int. Cl.
*G06F 16/27* (2019.01)
*G06F 16/907* (2019.01)
*G06F 16/182* (2019.01)

(52) U.S. Cl.
CPC .......... *G06F 16/27* (2019.01); *G06F 16/1844* (2019.01); *G06F 16/907* (2019.01)

(58) Field of Classification Search
CPC ..... G06F 16/1844; G06F 16/27; G06F 16/907
USPC .................................................. 707/600–899
See application file for complete search history.

(56) References Cited

U.S. PATENT DOCUMENTS

| | | | | |
|---|---|---|---|---|
| 7,243,163 B1 * | 7/2007 | Friend | ...................... | H04L 45/24 709/248 |
| 7,401,084 B1 * | 7/2008 | Sinha | ................ | G06F 16/24539 |
| 7,860,827 B1 * | 12/2010 | Ayyad | ................... | G06F 16/273 707/610 |
| 9,519,555 B2 * | 12/2016 | Calder | ................ | G06F 11/2076 |
| 9,798,792 B2 * | 10/2017 | Laiho | .................... | G06F 16/273 |
| 2006/0161593 A1 * | 7/2006 | Mori | ...................... | G16H 40/40 |
| 2006/0265511 A1 * | 11/2006 | Riggs | ....................... | H03M 7/30 709/231 |
| 2007/0136661 A1 * | 6/2007 | Park | .................... | G06F 16/4387 715/201 |
| 2007/0204275 A1 * | 8/2007 | Alshab | .................... | G06F 9/546 719/313 |
| 2011/0093435 A1 * | 4/2011 | Zha | ....................... | G06F 16/951 707/639 |
| 2018/0004829 A1 * | 1/2018 | Kathuria | ................. | G06F 16/27 |

* cited by examiner

*Primary Examiner* — Irete F Ehichioya
*Assistant Examiner* — Xiaoqin Hu
(74) *Attorney, Agent, or Firm* — Sterne, Kessler, Goldstein & Fox P.L.L.C.

(57) ABSTRACT

Disclosed herein are system, method, and computer program product embodiments for replication of database. In one embodiment, one or more data pages generated from a transaction are obtained at a first node. The one or more data pages are compressed. The compressed data pages are added into a first queue in a memory of the first node. The first queue includes a plurality of blocks. A first block of the compressed data pages in the first queue is transmitted to a second node when the first block of the compressed data pages becomes available for replication. The first block of the compressed data pages is stored in a persistent storage of the first node.

15 Claims, 9 Drawing Sheets

PHYSICAL REPLICATION OF DATABASE

BACKGROUND

Businesses need to protect their data against disasters. This can be done, for example, by implementing redundancy and disaster-recovery solutions, such as database replication. The replication of database plays an important role in consistency, fault tolerance, scalability, and further impacts performance. Known database replication approaches, however, have various challenges and difficulties such as the performance bottleneck caused by the size of data records and/or latency from input/output (I/O) operations.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, module, component, method and/or computer program product embodiments, and/or combinations and sub-combinations thereof, for replicating I/O logs generated from user transactions processed at a primary node to a replication node.

Figure 1:
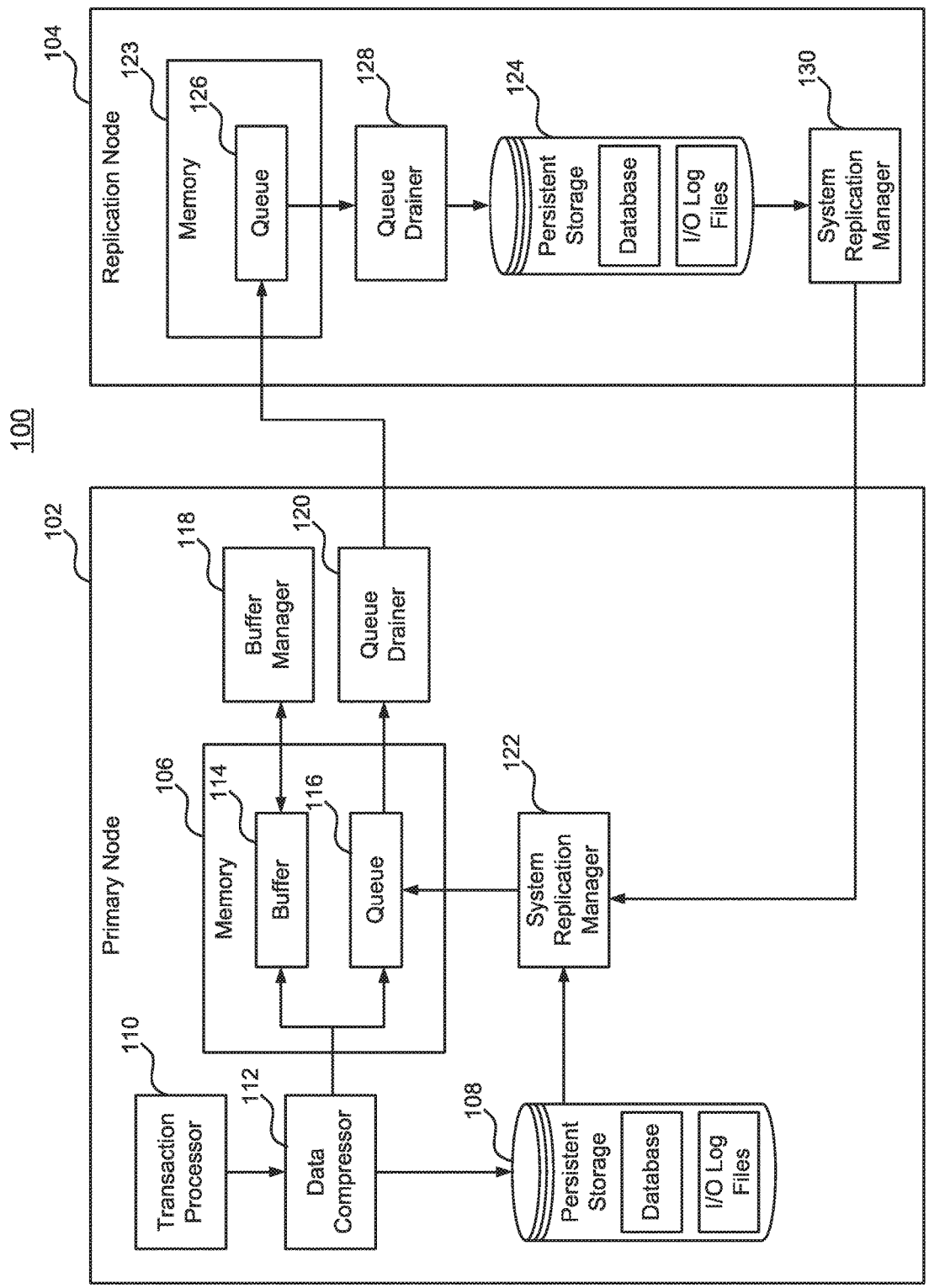
FIG. 1 is a block diagram of a system for replication of I/O logs, according to some embodiments.

FIG. 1 is a block diagram of a system 100 for replication of I/O logs, according to some embodiments. System 100 may be any centralized or distributed data processing and storage system (e.g., an online analytical processing "OLAP" system) that includes at least a primary node 102 (first node) and a replication node 104 (second node). In some embodiments, primary node 102 and replication node 104 are two separate physical machines so that the replication data backed up at replication node 104 remains intact in case primary node 102 is physically damaged. Various types of data-storage paradigms may be implemented on system 100, such as columnar database, key-value store, object-relational store, general database, etc. Data generated at primary node 102 can be replicated at replication node 104 in both active mode and synchronizing mode depending on the availability of replication node 104. Data replication may be achieved by either physical replication or logical replication. In some embodiments, data replication is achieved by physical replication, i.e., storing a copy of the actual data records at replication node 104, as opposed to logical replication, i.e., storing a logical representation of the actual data records (e.g., a pointer) at replication node 104. To improve the performance of data replication, in some embodiments, the actual data records may be replicated in a compressed format.

In some embodiments, the data includes I/O logs generated at primary node 102 and is in the form of data pages. The I/O logs may be then applied/replayed on to replication node 104 to bring the database state identical to that of primary node 102. Each I/O log may contain one or more data pages and one or more metadata pages. Each data page may represent physical data created by a transaction in a compressed format. In some embodiments, the I/O log is linear in nature, i.e., appended at the end and serialized among transactions. The data page may also include an identifier (ID), a sequence number, or an offset, which is globally unique for the data page and can be used as the basis for replaying a data page at any given point-in-time (PIT). In some embodiments, the data page may include additional information, such as the ID of the transaction, the ID of primary node 102 at which the data page is generated, the ID of replication node 104 at which the data page is to be replicated, and the date/time when the data page is generated and/or replicated.

In some embodiments, the data also includes metadata of the I/O logs in the form of metadata pages. Each metadata page may be generated from a transaction and associated with the one or more data pages generated from the same transaction. For example, a metadata page may precede or follow some associated data page(s). Each metadata page may include one or more metadata records, such as the ID of the transaction, the ID(s) of the associated data page(s), and an indicator of whether the transaction is committed (commitment ID/status).

As shown in FIG. 1, primary node 102 may be a server that includes a memory 106 and a persistent storage 108 (a.k.a. non-volatile storage). Persistent storage 108 may be any data-storage device that retains data after power to that device is shut off, such as hard disk drives and solid-state drives. Persistent storage 108 may include persistent database files and I/O log files. Data operations may be performed in memory 106 (e.g., in-memory copy) or in persistent storage 108 (e.g., writing data to a file). In-memory operations are usually faster than I/O operations (including operations in persistent storage 108). Primary node 102 may also include a plurality of operating logics implemented by one or more processors, including a transaction processor 110, a data compressor 112, a buffer manager 118, a queue drainer 120, and a system replication manager 122.

In some embodiments, transaction processor 110 is configured to process any transactions that occurs at primary node 102, and generate data from the transactions in the form of data pages as described herein. In some embodiments, transaction processor 110 may generate metadata pages as well. Data compressor 112 is operatively coupled to transaction processor 110 and configured to compress the data pages generated from the transactions. It is to be appreciated that depending on the type and size of the data, any suitable compression mechanisms may be employed by data compressor 112. In some embodiments, data compressor 112 may apply various levels of structural and binary encoding schemes to compress the data pages and generate compressed data pages in a highly compressed format. In some embodiments, the compression of data pages occurs prior to in-memory or I/O operations to the data pages to improve the performance of in-memory or I/O operations as the size of the data pages can be reduced by compression.

In some embodiments, memory 106 of primary node 102 includes a buffer 114 and a queue 116. Buffer 114 is operatively coupled to data compressor 112 and buffer manager 118. Buffer 114 includes a plurality of blocks, each of which is allocated with a predetermined size of memory space for storing the compressed data pages and metadata pages. In some embodiments, the size of each block of buffer 114 may be larger than the size of one compressed data page or one metadata page. Thus, each block of buffer 114 may contain more than one data page and/or metadata page. Buffer manager 118 may control the operation of adding data into buffer 114 and any other operations to the data in buffer 114. As described herein, since in-memory operations are usually faster than I/O operations, buffer 114 may temporally store the data before persistent storage 108 is ready for writing new data to the I/O log file.

Figure 2:
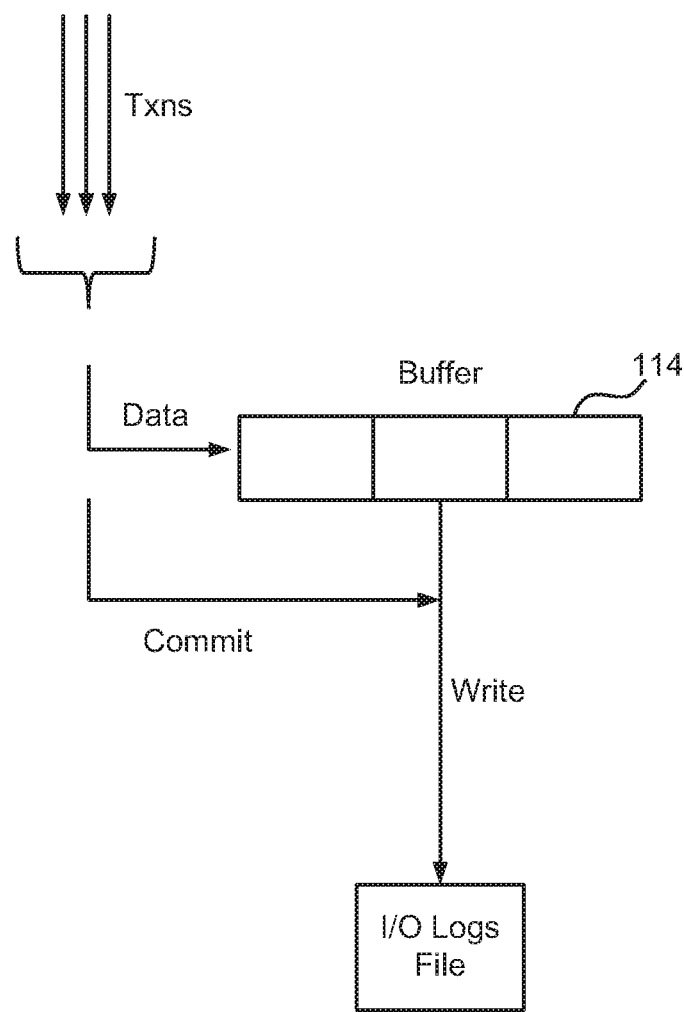
FIG. 2 illustrates an example of writing transaction data, according to some embodiments.

For example, as shown in FIG. 2, the data generated from the transactions is added into buffer 114 in memory 106. The data in buffer 114 may be written into the I/O log file in persistent storage 108 when buffer 114 is full. Or the data generated from a particular transaction may be written into the I/O log file when the transaction is committed (e.g., the data pages generated from the transaction have been backed up at replication node 104).

As shown in FIG. 1, queue 116 is operatively coupled data compressor 112 and queue drainer 120. Queue 116 includes a plurality of blocks, each of which is allocated with a predetermined size of memory space for storing the compressed data pages and metadata pages. In some embodiments, the size of each block of queue 116 may be lager than the size of one compressed data page or one metadata page. Thus, each block of queue 116 may contain more than one data page and/or metadata page. Data in queue 116 is removed ("dequeue") at the block level. It is appreciated that more than one queue 116 may be created in memory 106. In some embodiments, a first queue 116 may be used for active I/O logs replication, and a second queue 116 may be used for synchronizing missing I/O logs.

Queue drainer 120 may be configured to transmit the first block of data in queue 116 when the first block of data becomes available for replication. For example, a block of data is available for replication when the block is full of data pages and replication node 104 is ready to receive data from primary node 102 via a communication path. In some embodiments, data pages are kept adding to the subsequent block(s) of queue 116 when the first block of queue 116 is not available for replication, e.g., because replication node 104 and/or the communication path between replication node 104 and primary node 102 are busy. As soon as the first block of queue 116 becomes available for replication, queue drainer 120 removes the compressed data pages (and/or metadata page) in the first block of queue 116 and transmits them to replication node 104. In some embodiments, queue drainer 120 may be implemented as a background thread. As described herein, since in-memory operations are usually faster than I/O operations, data pages can be transmitted to replication node 104 using in-memory copy via queue 116 for replication, as opposed to using an I/O operation via persistent storage 108. The compression of data pages can further improve the performance of data replication.

In some embodiments, system replication manager 122 is operatively coupled to persistent storage 108 and queue 116. System replication manager 122 is configured to scan the data pages stored in the I/O logs from persistent storage 108 and determine the missing data page(s) that have not been replicated at replication node 104. System replication manager 122 is further configured to read the missing data page(s) from persistent storage 108 and add them to queue 116. In some embodiments, system replication manager 122 may be implemented as a thread team.

In some embodiments, system replication manager 122 may also perform space management of I/O logs in persistent storage 108. System replication manager 122 may periodically (e.g., every 2 minutes) clean up the space for I/O logs by truncating the I/O logs from an in-memory list of data pages based on the preset truncation rules, which ensures that the required I/O logs are retained while deleting I/O logs that are not required anymore. The in-memory list of I/O logs may be maintained by system replication manager 122 and represents I/O logs that have been backed up at replication node 104. It is to be appreciated that the truncation rules may be set in various ways. In one example, any I/O log that has been backed up at replication node 104 can be deleted from persistent storage 108. In another example, the maximum database I/O log space can be set (e.g., 1 GB), and the I/O logs can be deleted only when they have been backed up at replication node 104 and the accumulated I/O log space has reached the maximum limit.

Similar to primary node 102, as shown in FIG. 1, replication node 104 may be a server that includes a memory 123 and a persistent storage 124. Data operations may be performed in memory 123 (e.g., in-memory copy) or in persistent storage 124 (e.g., writing data to a file). Replication node 104 also includes a plurality of operating logics implemented by one or more processors, including a queue drainer 128 and a system replication manager 130. Replication node 104 and primary node 102 may communicate with each other via a bidirectional communication path, such as any suitable wired or wireless networks. A connection between primary node 102 and replication node 104 via the communication path may be initiated or closed by either primary node 102 or replication node 104 depending on the mode of operation as described below in detail.

In some embodiments, memory 123 includes a queue 126 having a plurality of blocks. Similar to queue 116 of primary node 102, each block of queue 126 may be allocated with a predetermined size of memory space for storing the compressed data pages and metadata pages received from primary node 102. As described herein, in-memory copy may be used to transfer the compressed data pages and metadata pages between queue 116 and queue 126. Queue drainer 128 is configured to control the addition and removal of data in queue 126. Queue drainer 128 removes the first block of the data pages from queue 126 when the first block of data becomes available for writing into I/O logs in persistent storage 124, for example, when persistent storage 124 is ready for I/O operations. In some embodiments, queue drainer 128 may be implemented as a background thread. In case there is a delay of writing new data pages into I/O logs in persistent storage 124, new data pages may be kept transmitting to replication node 104 and temporarily stored in queue 126 in memory 123. In some embodiments, once a new data page or a new block of data pages is added into queue 126, replication node 104 may transmit an acknowledgement of receiving the data page or block of data pages to primary node 102.

In some embodiments, system replication manager 130 is operatively coupled to I/O logs in persistent storage 124 and configured to scan the data pages stored in the I/O logs in persistent storage 124. In some embodiments, if replication node 104 has been unavailable for data replication for a while, i.e., not being able to back up the data pages generated at primary node 102, once replication node 104 is back online, system replication manager 130 then scans the I/O logs to determine an indicator of the missing data pages. The indicator may be the ID (or sequence number, offset) of the last data page received from primary node 102 and stored in I/O log in persistent storage 124. System replication manager 130 can transmit a synchronizing request with the indicator to system replication manager 122 of primary node 102 asking for synchronizing the missing data pages. In some embodiments, system replication manager 130 may be implemented as a thread team.

Similar to system replication manager 122 of primary node 102, in some embodiments, system replication manager 130 of replication node 104 may also perform space management of I/O logs in persistent storage 124. System replication manager 130 may periodically (e.g., every 2 minutes) clean up the space by truncating the I/O logs from an in-memory list of based on the preset truncation rules, which ensures that the required I/O logs are retained before they are replayed at replication node 104. The in-memory list of I/O logs may be maintained by system replication manager 130 and represents I/O logs that have been replayed at replication node 104. It is to be appreciated that the truncation rules may be set in various ways. In one example, any I/O log that is yet to be replayed at replication node 104 cannot be deleted from persistent storage 124. In another example, the maximum I/O log file space can be set (e.g., 1 GB), and the I/O logs can be deleted only when they have been replayed at replication node 104 and the accumulated I/O log space has reached the maximum limit.

Figure 3:
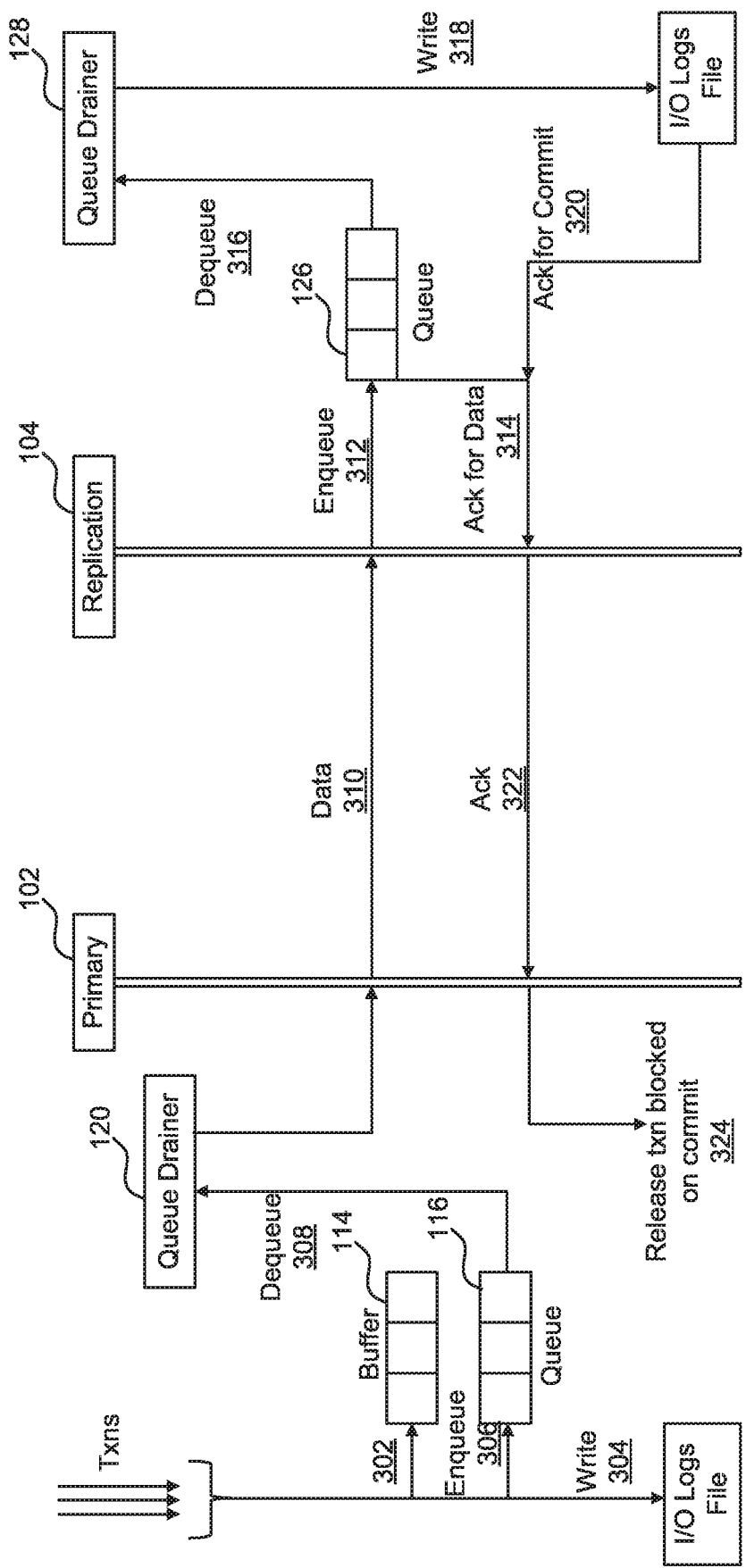
FIG. 3 is an event diagram illustrating an example of active log replication, according to some embodiments.
Figure 4:
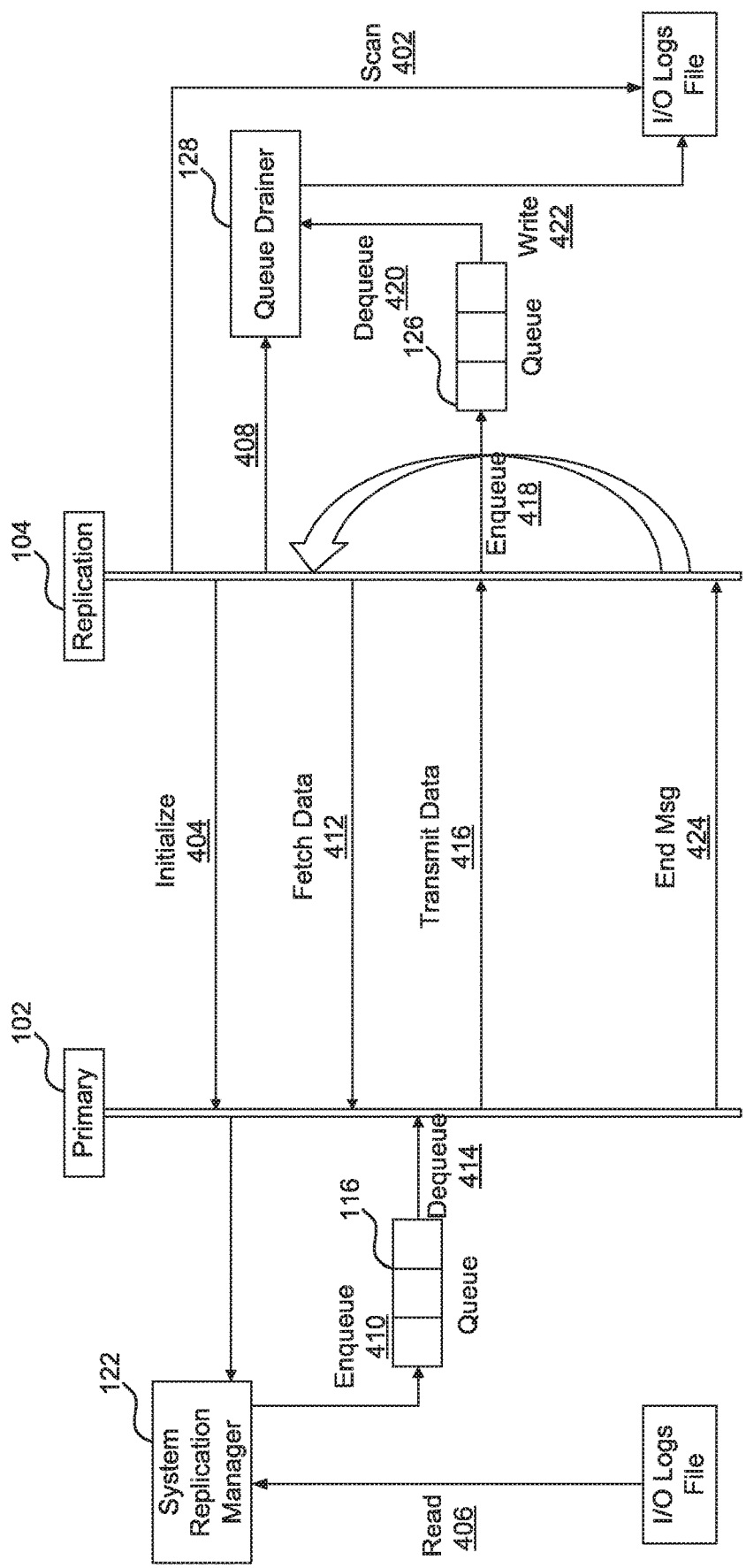
FIG. 4 is an event diagram illustrating an example of synchronizing log replication, according to some embodiments.

Various modes of I/O logs replication can be performed by system 100 as further illustrated in FIGS. 3 and 4. FIG. 3 is an event diagram illustrating an example of active data replication (active mode), according to some embodiments. In operation, in 302, data pages generated from transactions ("Txns") processed by primary node 102 are added into buffer 114 of primary node 102. In some embodiments, the data pages are compressed. In 304, when buffer 114 is full or a transaction is committed, the corresponding data pages are written into a I/O log file stored at primary node 102. At substantially the same time, in 306, the data pages are added into queue 116 ("enqueue") as well. The size of queue 116 is multiple times of the size of a block of data pages. In addition to data pages, metadata pages may be added into queue 116 with a flag, following the associated data page(s). In 308, queue drainer 120 removes blocks of queue 116 one at a time from queue 116 ("dequeue") as soon as one block of queue 116 becomes available for replication. Queue drainer 120 may also update statistics related to in-memory data pages, e.g., the last data page added into or removed from queue 116. In 310, primary node 102 transmits data (e.g., the data pages and metadata pages) organized in blocks to replication node 104 using in-memory copy. In some embodiments, primary node 102 may also make a remote procedure call (RPC) to replication node 104 passing parameters such as data pages to be transmitted, commitment ID/status, ID of primary node 102, etc. If at any time the connection between primary node 102 and replication node 104 gets disconnected, primary node 102 may stop transmitting any data pages, and the transactions may continue as if running on a non-replicated system. Primary node 102 may resume replication as soon as replication node 104 reconnects and requests for missing data pages.

In 312, at replication node 104 side, data received from primary node 102 is added into queue 126 of replication node 104 ("enqueue"). In 314, an acknowledgement for data added into queue 126 is generated. In some embodiments, primary node 102 may wait for the acknowledgement for data from replication node 104 before proceeding to transmit the subsequent data. In 316, queue drainer 128 monitors queue 126 and removes blocks of queue 126 one at a time from queue 126 ("dequeue") as soon as one block of queue 126 becomes available for writing. In 318, the data removed from queue 126 is written into the I/O log file at replication node 104. In 320, when the data generated from a transaction (e.g., data pages and the metadata page) is written into the I/O log file, an acknowledgment for commitment is generated. In 322, replication node 104 transmits the acknowledgment for commitment to primary node 102. In 324, primary node 102 releases the transaction block on commitment as the data pages related to the transaction have been backed up at replication node 104. In some embodiments, primary node 102 will not write the metadata page of the transaction into the I/O log file at primary node 102 until primary node 102 receives the acknowledgement for commitment of the transaction from replication node 104.

FIG. 4 is an event diagram illustrating an example of synchronizing data replication (synchronizing mode), according to some embodiments. As described herein, during any time in the active mode when the connection between primary node 102 and replication node 104 is closed (e.g., replication node 104 becomes offline), the active mode of I/O logs replication stops. Once the connection resumes (e.g., replication node 104 becomes online again), the I/O logs replication switches to the synchronizing mode. In operation, in 402, once the synchronizing mode starts, replication node 104 scans the I/O log file to find the last data page received from primary node 102 and stored in the I/O log file. In 404, replication node 104 initiates the missing data page synchronization by transmitting a request with information related to the last data page to primary node 102, for example, by a RPC call.

In 406, system replication manager 122 of primary node 102 determines and reads the missing data pages in the I/O log file based on the last data page backed up at replication node 104. In 408, primary node 102 transmits information related to the missing data pages to replication node 104. In 410, system replication manager 122 adds the missing data pages into queue 116 ("enqueue"). That is, in some embodiments, in response to the initial RPC call from replication node 104, primary node 102 creates a thread team (system replication manager 122) for prefetching the missing data pages from the I/O log file in persistent storage 108 to queue 116 in memory 106. In some embodiments, queue 116 used for missing data pages in the synchronizing mode is the same as queue 116 used for active data pages in the active mode when the missing data pages and active data pages are not transmitted in parallel, i.e., the active mode will commence when the synchronizing mode is finished. In some embodiments, queue 116 used in the synchronizing mode may be separate from queue 116 used in the active mode.

In 412, replication node 104 fetches the missing data pages. Replication node 104 may transmit the first fetching request for missing data pages by making an RPC call to primary node 102.

In response to the first fetching request, in 414, primary node 102 removes the first block of the missing data pages in queue 116 ("dequeue"). In 416, primary node 102 transmits the first block of the missing data pages to replication node 104. If queue 116 is empty, primary node 102 may wait until the missing data pages are populated into the first block of queue 116.

In 418, replication node 104 receives the first block of the missing data pages and adds it to queue 126 of replication node 104 ("enqueue"). In 420, queue drainer 128 monitors queue 126 and removes the first block of the missing data pages from queue 126 ("dequeue") as soon as the first block of the missing data pages becomes available for writing. In 422, the missing data pages removed from queue 126 are written into the I/O log file at replication node 104. Unless replication node 104 receives an end message from primary node 102 indicating that the missing data pages have been transmitted to replication node 104, replication node 104 will keep pulling the missing data pages by fetching the next block of the missing data pages. The process repeats, starting from 412, until in 424 primary node 102 transmits the end message to replication node 104 indicating that the synchronization of missing data pages is done.

Figure 5:
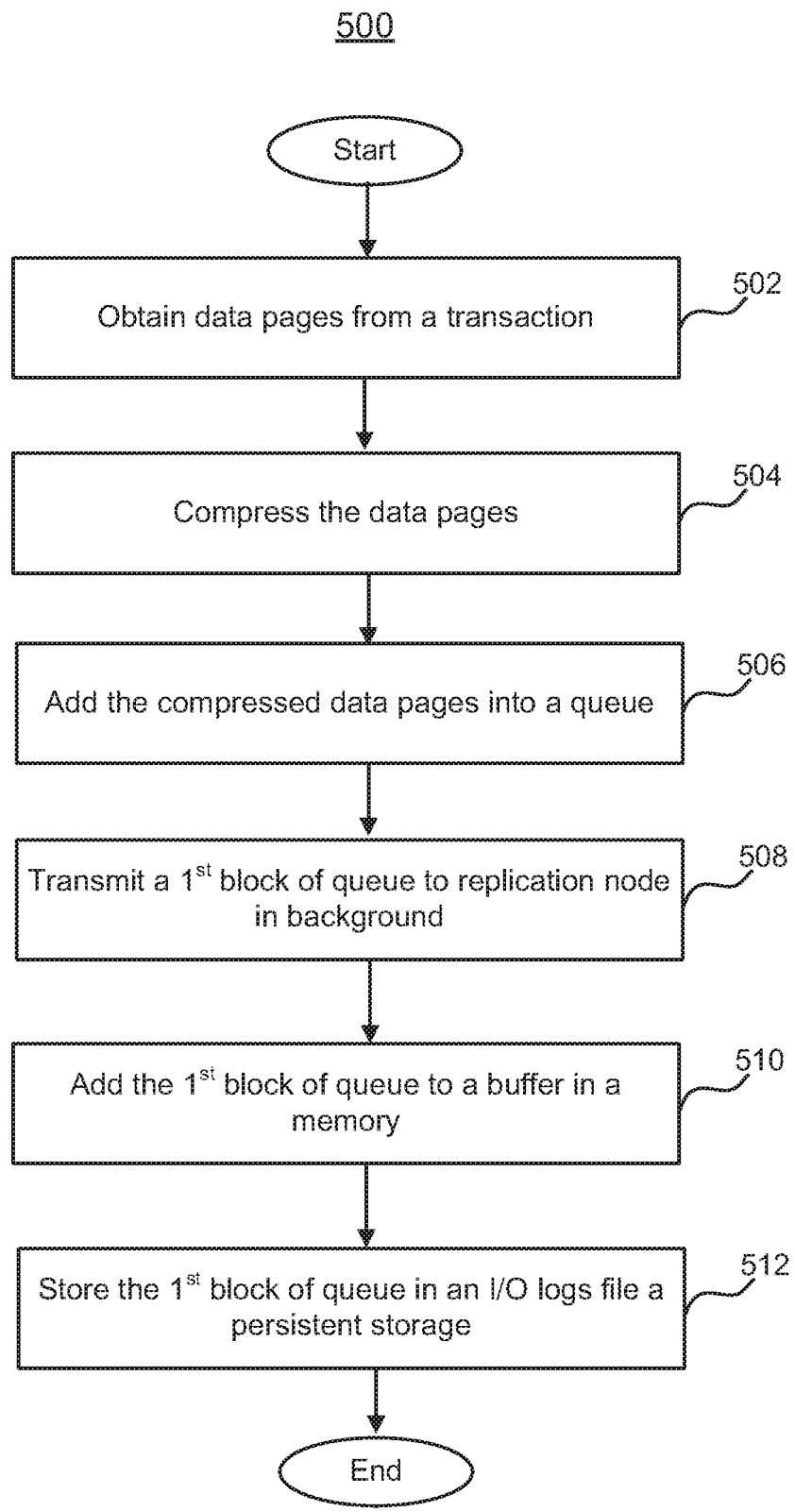
FIG. 5 is a flowchart of a method for active replication of I/O logs, according to some embodiments.

FIG. 5 is a flowchart of a method for active replication of I/O logs, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 1. However, method 500 is not limited to that example embodiment. In 502, primary node 102 obtains one or more data pages generated from a transaction processed at primary node 102. Each data page may include one or more data records indicating the order in which the data page is generated from the transaction. In some embodiments, primary node 102 may also obtain a metadata page generated from the same transaction and associated with the one or more data pages. The metadata page may include IDs of the data pages generated from the same transaction.

In 504, primary node 102 compresses the obtained data pages. In some embodiments, the compression may include various levels of structural and/or binary encoding schemes so that the resulting data pages are in a highly compressed format.

In 506, primary node 102 adds the compressed data pages into queue 116 in memory 106 of primary node 102. Queue 116 includes a plurality of blocks. In some embodiments, each block of queue 116 may have a predetermined size, which can contain a plurality of data pages. Depending on the number and size of the compressed data pages and the size of each block of queue 116, in some embodiments, the compressed data pages may be added into one block of queue 116 or multiple blocks of queue 116. In some embodiments, the metadata page associated with the data pages may be added into queue 116 as well, for example, before or after the data pages.

In 508, primary node 102 transmits a first block of the compressed data pages in queue 116 to replication node 104 in background when the first block of queue 116 becomes available for replication. In some embodiments, the first block of queue 116 becomes available when it is full of data pages and replication node 104 is ready to receive data from primary node 102 via a communication path. In some embodiments, the first block of queue 116 may include the compressed data pages generated from the transaction (either having additional data page(s) generated from another transaction or not). In some embodiments, the first block of queue 116 may include some of the compressed data pages generated from the transaction, and the rest of the compressed data pages generated from the same transaction is transmitted to replication node 104 in the subsequent block(s) of queue 116.

In 510, primary node 102 adds the first block of the compressed data pages in buffer 114 in memory 106 of primary node 102.

In 512, primary node 102 stores the first block of the compressed data pages in queue 116 into the I/O logs file in persistent storage 108 of primary node 102. In some embodiments, the data pages generated from the transaction in the first block of queue 116 are thus both written in a compressed format into a file stored at primary node 102 and backed up in the compressed format at replication node 104.

As described herein, the data pages generated from the transaction may be stored not only in the first block of queue 116, but also in subsequent block(s) of queue 116. In some embodiments, after transmitting the first block of queue 116, primary node 102 may transmit a second block of the compressed data pages in queue 116 to replication node 104 when the second block of queue 116 becomes available for replication. Primary node 102 may receive an acknowledgment from replication node 104, which indicates that the data pages generated from the transaction have been stored in persistent storage 124 of replication node 104, i.e., being successfully backed up at replication node 104. In response to receiving the acknowledgment, primary node 102 may store the metadata page associated with the data pages generated from the same transaction in persistent storage 108 of primary node 102, i.e., releasing the transaction blocked on commitment.

Figure 6:
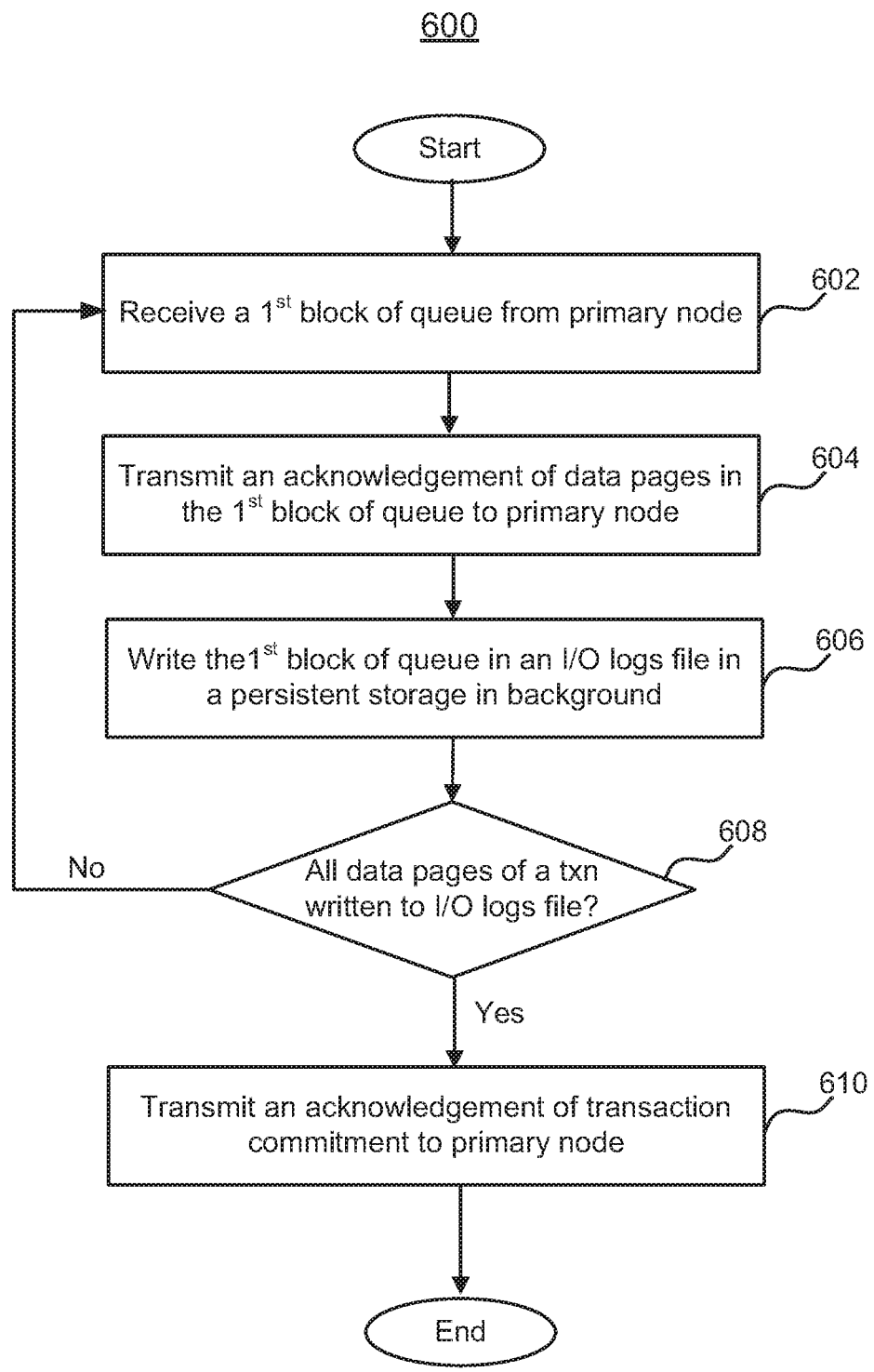
FIG. 6 is a flowchart of another method for active replication of I/O logs, according to some embodiments.

FIG. 6 is a flowchart for another method of active replication of I/O logs, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 1. However, method 600 is not limited to that example embodiment. In 602, replication node 104 receives the first block of the compressed data pages of queue 116 from primary node 102. In some embodiments, the first block of the compressed data pages is added into queue 126 in memory 123 of replication node 104.

In 604, replication node 104 sends an acknowledgement of receiving the data pages in the first block of queue 116 to primary node 102. In some embodiments, the acknowledgement may be at the block level (e.g., with respect to the entire block) or at the data page level (e.g., with respect to one data page in the block).

In 606, when the first block of the compressed data pages becomes available for writing at replication node 104, it writes the first block of the compressed data pages in the I/O log file in persistent storage 124 of replication node 104 in background.

In 608, replication node 104 checks whether all the data pages generated from the transaction processed at primary node 102 have been stored in the I/O file persistent storage 124 of replication node 104, i.e., being successfully backed up at replication node 104. As described herein, the data pages generated from the transactions may be stored not only in the first block of queue 116, but also in subsequent block(s) of queue 116. In some embodiments, after receiving the first block of queue 116, replication node 104 may receive the second block of the compressed data pages in queue 116 from primary node 102. In some embodiments, replication node 104 may make the determination when the metadata page associated with the data pages generated from the same transaction is received by replication node 104, either in the first, second, or any other subsequently received block.

In 610, if all the data pages generated from the same transaction have been stored, e.g., all data pages in queue preceding commit are written to the I/O log file, replication node 104 transmits the acknowledgement of transaction commitment (i.e., the data pages generated from the transaction have been backed up at replication node 104) to primary node 102. Otherwise, method 600 returns to 602 to receive the next block of queue until all data pages before commit are written to the I/O log file.

Figure 7:
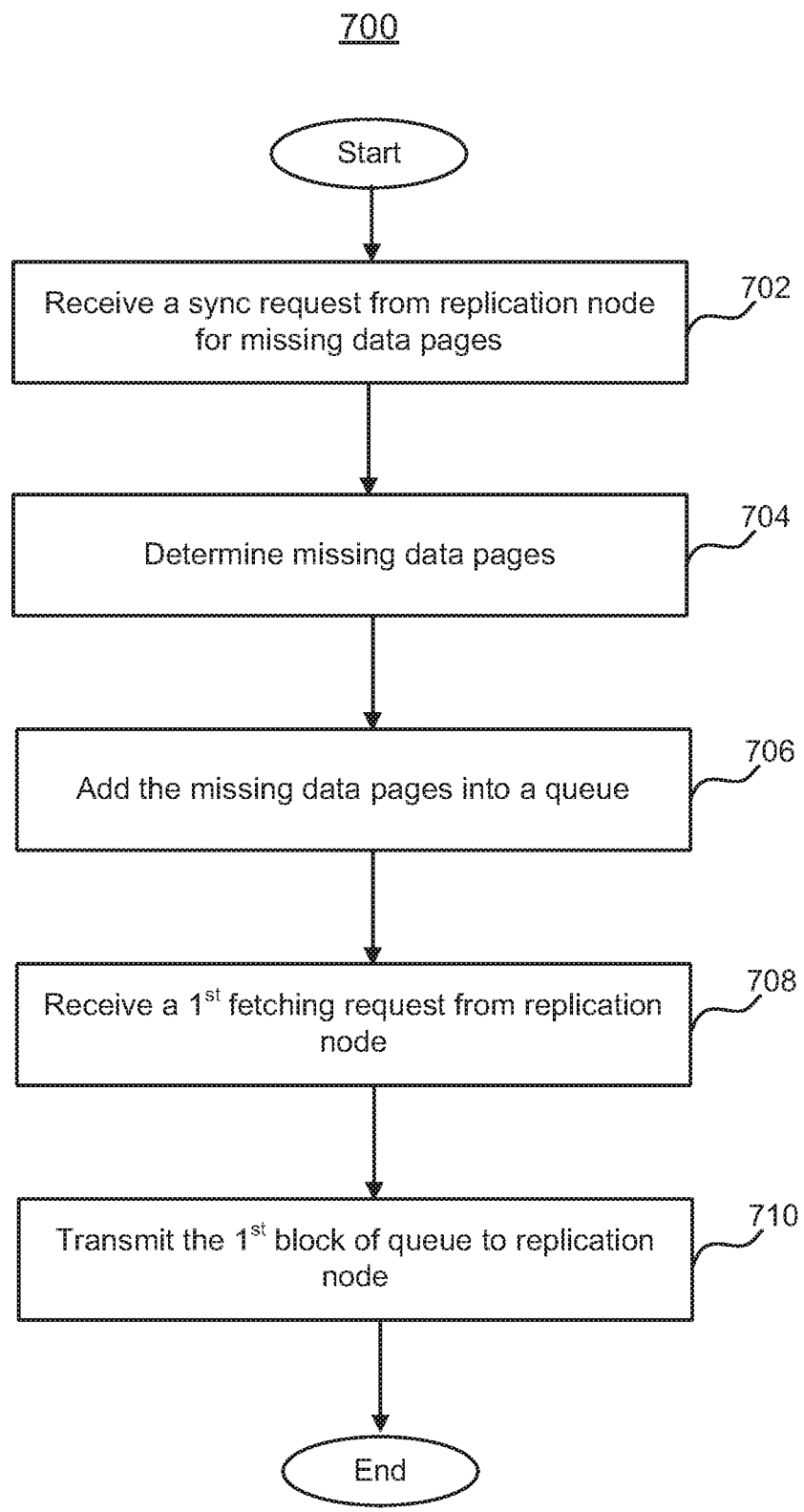
FIG. 7 is a flowchart of a method for synchronizing I/O log replication, according to some embodiments.

FIG. 7 is a flowchart for a method of synchronizing I/O logs replication, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 1. However, method 700 is not limited to that example embodiment. In 702, primary node 102 receives a synchronizing request from replication node 104 for synchronizing missing data pages. Replication node 104 may have been unavailable for receiving data pages from primary node 102 for a while and need to synchronize with primary node 102 by fetching the missing data pages from primary node 102. The synchronizing request may include an indicator of data pages stored in persistent storage 124 of replication node 104. In some embodiments, the indicator may be the ID of the last data page that has been received from primary node 102 and stored in persistent storage 124.

In 704, primary node 102 determines the missing data pages of replication node 104 based on the indicator in the synchronizing request. In some embodiments, the missing data pages may include the data pages between the last data page stored in persistent storage 124 of replication node 104 and the most-recent data page stored in persistent storage 108 of primary node 102.

In 706, primary node 102 adds the missing data pages into queue 116 in memory 106 of primary node 102. As described herein, as queue 116 includes a plurality of blocks, the missing data pages may be added into one or more blocks of queue 116.

In 708, primary node 102 receives a first fetching request from replication node 104 for fetching the first block of the missing data pages in queue 116.

In 710, in response to the first fetching request, primary node 102 transmits the first block of the missing data pages in queue 116 to replication node 104. In some embodiments, if the missing data pages are only contained in the first block of queue 116, primary node 102 then may transmit an end message to replication node 104 to notify replication node 104 that the missing data pages have been transmitted to replication node 104. In some embodiments, additional missing data pages may be stored in subsequent block(s) of queue 116. Thus, without transmitting the end message to replication node 104, primary node 102 may receive a second fetching request from replication node 104 for fetching the second block of the missing data pages in queue 116 and transmit the second block of the missing data pages to replication node 104. The process may continue until primary node 102 has transmitted the missing data pages to replication node 104 and transmitted the end message to the replication node 104.

Figure 8:
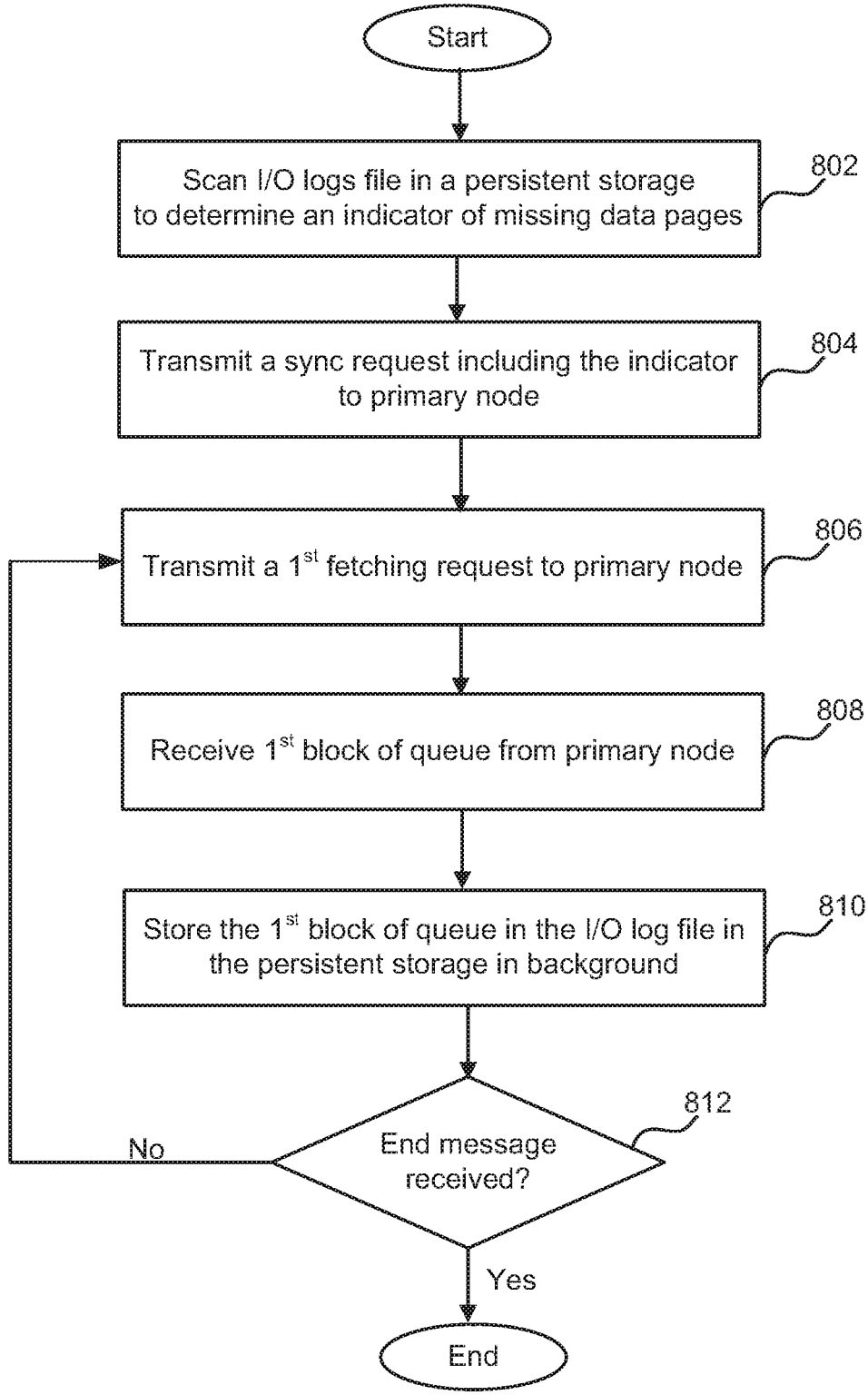
FIG. 8 is a flowchart of another method for synchronizing PO log replication, according to some embodiments.

FIG. 8 is a flowchart of another method for synchronizing I/O logs replication, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 1. However, method 800 is not limited to that example embodiment. In 802, after becoming available for replication again, replication node 104 scans the I/O logs file (e.g., the data pages) in persistent storage 124 of replication node 104 to determine the indicator of the missing data pages. In some embodiments, the indicator may be the ID of the last data page stored in persistent storage 124. In some embodiments, the indicator may be the last persisted I/O log position.

In 804, replication node 104 transmits the synchronizing request including the indicator to primary node 102 for synchronizing the missing data pages.

In 806, replication node 104 transmits the first fetching request to primary node 102 for fetching the first block of the missing data pages in queue 116.

In 808, replication node 104 receives the first block of the missing data pages in queue 116 from primary node 102.

In 810, replication node 104 stores the first block of the missing data pages in the I/O logs file in persistent storage 124 of replication node 104 in background.

In 812, replications node 104 checks whether the end message is received from primary node 102, which notifies replication node 104 that the missing data pages have been transmitted. If the end message is received, method 800 ends. Otherwise, method 800 returns to 806. For example, replication node 104 may keep transmitting the second, third, or any subsequent fetching request(s) to primary node 102 and receiving the second, third, or any subsequent block(s) of queue 116 from primary node 102 until receiving the end message.

Figure 9:
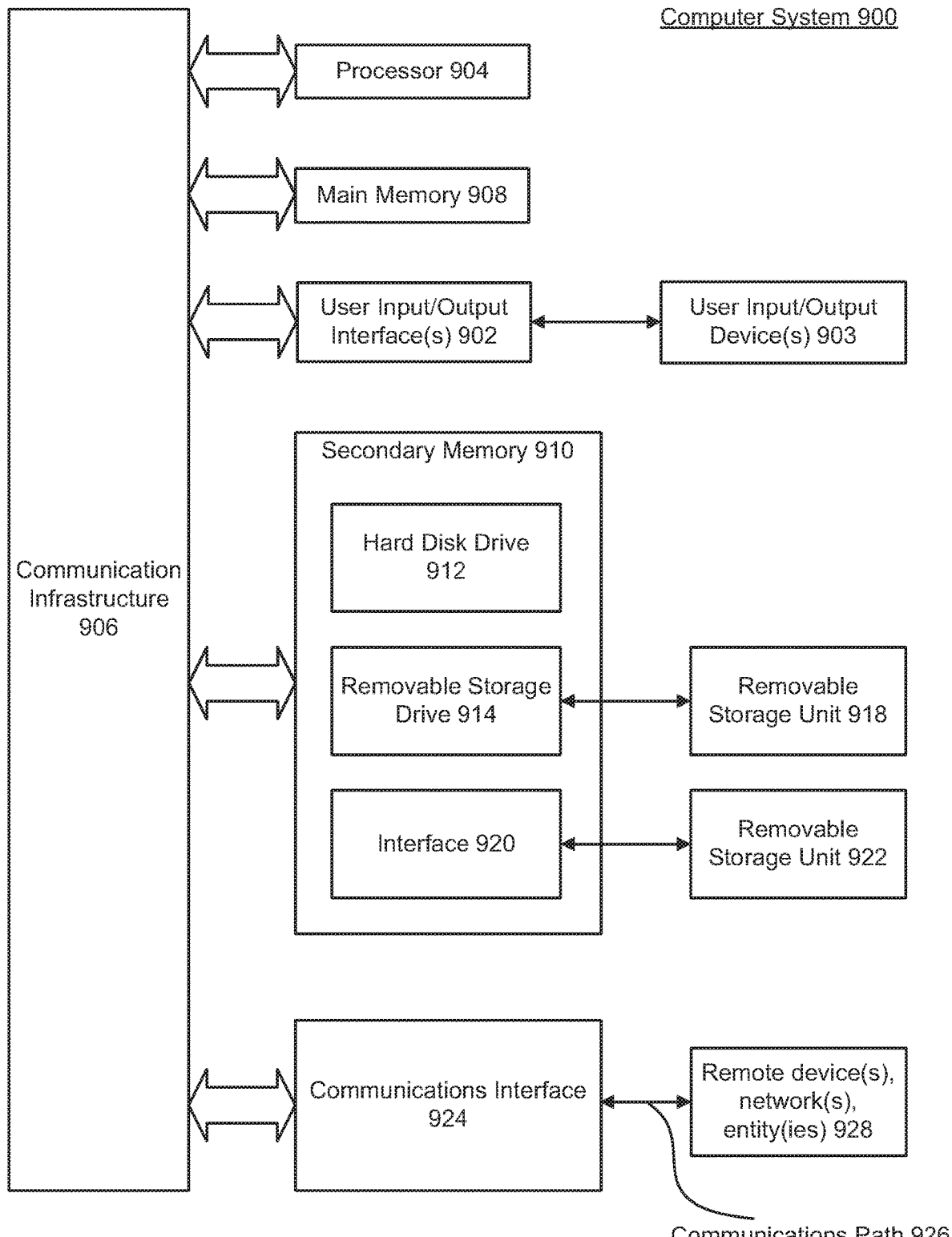
FIG. 9 is an example computer system useful for implementing various embodiments.

Various embodiments can be implemented, for example, using one or more computer systems, such as computer system 900 shown in FIG. 9. One or more computer system 900 can be used, for example, to implement method 500 of FIG. 5, method 600 of FIG. 6, method 700 of FIG. 7, and method 800 of FIG. 8. For example, computer system 900 can perform active replication of I/O logs, as well as synchronizing of I/O logs replication according to some embodiments. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data. Main memory 908 may include any memory (e.g., 106 and 123) described above in the present disclosure.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive. Secondary storage devices or memory 910 may include any persistent storage (e.g., 108 and 124) described above in the present disclosure.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communication path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the present disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the present disclosure should not be limited by any of the above-described exemplary embodiments, but should be defined only in accordance with the following claims and their equivalents.

What is claimed is:

1. A computer implemented method, comprising:
   determining that a connection between a primary node and a replication node has been restored, wherein the primary node includes one or more compressed data pages generated from transactions and stored in a primary persistent storage of the primary node, and wherein the primary node includes both an active page queue for storing data pages corresponding to active transactions and a synchronizing page queue for storing data pages corresponding to transactions to be replicated to the replication node;

receiving, at the primary node, a synchronization request from the replication node after the connection between the replication node and the primary node is restored, wherein the synchronization request indicates a last data page received from the primary node prior to a termination of the connection preceding the restoration of the connection, and stored in a replication persistent storage of the replication node;

retrieving, by the primary node, one or more data pages from the primary persistent storage of the primary node based on the last data page indicated by the synchronization request;

obtaining, by the primary node, a metadata page associated with the retrieved one or more data pages;

storing, by the primary node, the retrieved one or more data pages and the associated metadata page with a flag in the synchronizing page queue of the primary node based on the synchronization request, wherein the metadata page follows the associated one or more data pages;

storing, by the primary node, one or more new data pages for transactions in the active page queue;

receiving, by the primary node and from the replication node, a fetching request for missing data pages;

providing, by the primary node in response to the fetching request, at least a subset of the one or more data pages from the synchronizing page queue to the replication node;

receiving, by the primary node, an acknowledgement from the replication node indicating that the one or more data pages are stored in a replication persistent storage of the replication node; and in response to receiving the acknowledgement, storing, by the primary node, the metadata page associated with the one or more data pages in the primary persistent storage of the primary node.

2. The method of claim 1, further comprising:
receiving, by the primary node, a fetching request from the replication node for fetching a first block of missing data pages; and
in response to receiving the fetching request, transmitting, by at least one processor, the first block of the missing data pages to a queue of the replication node.

3. The method of claim 1, wherein each of the one or more compressed data pages comprises a data record indicating an order in which the data record is generated from one or more user transactions.

4. The method of claim 1, further comprising:
adding, by the primary node, the one or more compressed data pages into a buffer in a memory of the primary node.

5. The method of claim 1 wherein data from the synchronizing page queue is transmit prior to any remaining data from the active page queue.

6. The method of claim 1 further comprising:
determining that the connection between the primary node and the replication node is terminated and resumed after a period of time, wherein a portion of a first block of the one or more compressed data pages stored in the primary persistent storage of the primary node was not stored in the replication persistent storage of the replication node.

7. The method of claim 1, wherein the providing comprises writing one or more missing data pages into an input-output log file.

8. The method of claim 2, further comprising:
determining that a maximum database log space has been exceeded and the acknowledgement has been received before deleting the first block.

9. The method of claim 2, wherein a size of the first block is larger than a size of one of the compressed data pages.

10. The method of claim 1, wherein the primary node stored one or more data pages in the active page queue before the connection was restored.

11. A system, comprising:
a memory; and
at least one processor coupled to the memory and configured to execute instructions that cause the at least one processor to:
determine that a connection between a primary node and a replication node has been restored, wherein the primary node includes one or more compressed data pages generated from transactions and stored in a primary persistent storage of the primary node, and wherein the primary node includes both an active page queue for storing data pages corresponding to active transactions and a synchronizing page queue for storing data pages corresponding to transactions to be replicated to the replication node;
receive, at the primary node, a synchronization request from the replication node after the connection between the replication node and the primary node is restored, wherein the synchronization request indicates a last data page received from the primary node prior to a termination of the connection preceding the restoration of the connection, and stored in a replication persistent storage of the replication node;
retrieve, by the primary node, one or more data pages from the primary persistent storage of the primary node based on the last data page indicated by the synchronization request;
obtain, by the primary node, a metadata page associated with the retrieved one or more data pages;
store, by the primary node, the retrieved one or more data pages and the associated metadata page with a flag in the synchronizing page queue of the primary node based on the synchronization request, wherein the metadata page follows the associated one or more data pages;
store, by the primary node, one or more new data pages for transactions in the active page queue;
receive, by the primary node and from the replication node, a fetching request for missing data pages;
provide, by the primary node in response to the fetching request, at least a subset of the one or more data pages from the synchronizing page queue to the replication node;
receive, by the primary node, an acknowledgement from the replication node indicating that the one or more data pages are stored in a replication persistent storage of the replication node; and
in response to receiving the acknowledgement, store, by the primary node, the metadata page associated with the one or more data pages in the primary persistent storage of the primary node.

12. The system of claim 11, the at least one processor further configured to:
receive a fetching request from the replication node for fetching a first block of missing data pages; and in response to receiving the fetching request, transmit the first block of the missing data pages to a queue of the replication node.

13. The system of claim 11, wherein each of the one or more compressed data pages comprises a data record indicating an order in which the data record is generated from one or more user transactions.

14. A non-transitory computer-readable medium having instructions stored thereon that, when executed by at least one computing device, causes the at least one computing device to perform operations comprising:

determining that a connection between a primary node and a replication node has been restored, wherein the primary node includes one or more compressed data pages generated from transactions and stored in a primary persistent storage of the primary node, and wherein the primary node includes both an active page queue for storing data pages corresponding to active transactions and a synchronizing page queue for storing data pages corresponding to transactions to be replicated to the replication node;

receiving, at the primary node, a synchronization request from the replication node after the connection between the replication node and the primary node is restored, wherein the synchronization request indicates a last data page received from the primary node prior to a termination of the connection preceding the restoration of the connection, and stored in a replication persistent storage of the replication node;

retrieving, by the primary node, one or more data pages from the primary persistent storage of the primary node based on the last data page indicated by the synchronization request;

obtaining, by the primary node, a metadata page associated with the retrieved one or more data pages;

storing, by the primary node, the retrieved one or more data pages and the associated metadata page with a flag in the synchronizing page queue of the primary node based on the synchronization request, wherein the metadata page follows the associated one or more data pages;

storing, by the primary node, one or more new data pages for transactions in the active page queue;

receiving, by the primary node and from the replication node, a fetching request for missing data pages;

providing, by the primary node in response to the fetching request, at least a subset of the one or more data pages from the synchronizing page queue to the replication node;

receiving, by the primary node, an acknowledgement from the replication node indicating that the one or more data pages are stored in a replication persistent storage of the replication node; and in response to receiving the acknowledgement, storing, by the primary node, the metadata page associated with the one or more data pages in the primary persistent storage of the primary node.

15. The non-transitory computer-readable medium of claim 14, the operations further comprising:

receiving a fetching request from the replication node for fetching a first block of missing data pages; and in response to receiving the fetching request, transmitting, by the primary node, the first block of the missing data pages to a queue of the replication node.

* * * * *